(12) United States Patent
Fuchs et al.

(10) Patent No.: US 8,792,433 B2
(45) Date of Patent: Jul. 29, 2014

(54) HARDWARE IMPLEMENTATION OF UPLINK RECEIVER WITH MATCHED THROUGHPUT

(75) Inventors: Robert Jason Fuchs, San Diego, CA (US); Devyani N. Pisolkar, San Diego, CA (US); Hao Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 13/104,882

(22) Filed: May 10, 2011

(65) Prior Publication Data

US 2011/0280200 A1    Nov. 17, 2011

Related U.S. Application Data

(60) Provisional application No. 61/333,642, filed on May 11, 2010.

(51) Int. Cl.
*H04W 4/00* (2009.01)
*H04L 25/03* (2006.01)
*H04L 25/02* (2006.01)
*H04L 27/26* (2006.01)

(52) U.S. Cl.
CPC ...... *H04L 27/2647* (2013.01); *H04L 25/03171* (2013.01); *H04L 25/0204* (2013.01); *H04L 25/0232* (2013.01)
USPC .......................................................... 370/329

(58) Field of Classification Search
CPC .................................................. H04L 27/2647
USPC .......................................................... 370/329
See application file for complete search history.

(56) References Cited

U.S. PATENT DOCUMENTS

| 2010/0034312 A1* | 2/2010 | Muharemovic et al. ...... 375/267 |
| 2010/0074305 A1 | 3/2010 | Lee et al. |
| 2010/0110874 A1* | 5/2010 | Kang et al. .................... 370/208 |

FOREIGN PATENT DOCUMENTS

WO    2007106366 A2    9/2007

OTHER PUBLICATIONS

Guohui Wang et al: "FPGA prototyping of a high data rate LTE uplink baseband receiver" Signals, Systems and Computers, 2009 Conference Record of the Forty-Third Asilomar Conference on, IEEE, Piscataway, NJ, USA, Nov. 1, 2009, pp. 248-252, XP031679630.*
Guohui Wang et al: "FPGA prototyping of a high data rate LTE uplink baseband receiver" Signals, Systems and Computers, 2009 Conference Record of the Forty-Third Asilomar Conference on, IEEE, Piscataway, N J, USA, Nov. 1, 2009, pp. 248-252.*
International Search Report and Written Opinion—PCT/US2011/036096, International Search Authority—European Patent Office—Aug. 19, 2011.
Pancaldi F et al: "Single-carrier frequency domain equalization", IEEE Signal Processing Magazine, IEEE Service Center, Piscataway, NJ, US, vol. 25, No. 5, Sep. 1, 2008, pp. 37-56, XP011233603.

\* cited by examiner

*Primary Examiner* — Noel Beharry
*Assistant Examiner* — Farhad Ali
(74) *Attorney, Agent, or Firm* — Kenneth K. Vu; Ashish L. Patel

(57) ABSTRACT

Certain aspects of the present disclosure provide an apparatus and techniques for efficiently processing uplink communications. A telecommunications receiver processor architecture is provided that may be utilized with a LTE eNodeB base station wherein the data path throughput is optimally matched for a Physical Uplink Shared Channel (PUSCH) receiver. According to certain aspects, the receiver may be configured to perform operations on OFDMs symbols in an interleaved order. Additionally, the receiver may instantiate multiple IDFT engines to process multiple OFDM symbols in parallel.

28 Claims, 6 Drawing Sheets

Incoming H data stream

H[0,0]: $h_{00}$
H[0,1]: $h_{01}$
H[0,2]: $h_{10}$
H[0,3]: $h_{11}$
H[1,0]: $h_{20}$
H[1,1]: $h_{21}$
H[1,2]: $h_{30}$
H[1,3]: $h_{31}$

| | | | | |
|---|---|---|---|---|
| ⋮ | ⋮ | ⋮ | ⋮ | |
| $h_{31}$ | $h_{30}$ | $h_{21}$ | $h_{20}$ | H Array Row |
| $h_{11}$ | $h_{10}$ | $h_{01}$ | $h_{00}$ | |
| 3 | 2 | 1 | 0 | |

H Array Column

H data stream after reordering

| | | | | |
|---|---|---|---|---|
| ⋮ | ⋮ | ⋮ | ⋮ | |
| $h_{31}$ | $h_{21}$ | $h_{11}$ | $h_{01}$ | H Array Row |
| $h_{30}$ | $h_{20}$ | $h_{10}$ | $h_{00}$ | |
| 3 | 2 | 1 | 0 | |

H Array Column

FIG. 5

HARDWARE IMPLEMENTATION OF UPLINK RECEIVER WITH MATCHED THROUGHPUT

CLAIM OF PRIORITY UNDER 35 U.S.C. §119

The present Application for patent claims benefit of U.S. Provisional Patent Application Ser. No. 61/333,642, entitled, "Hardware Implementation of PUSCH Receiver That Is Optimally Matched to Maximize Throughput," filed May 11, 2010, and assigned to the assignee hereof and hereby expressly incorporated by reference herein.

BACKGROUND

1. Field

Certain aspects of the disclosure relate generally to wireless communications systems and, more particularly, to an apparatus for efficiently processing Orthogonal Frequency Division Multiplexing (OFDM) symbols in uplink transmissions.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Single-Carrier Frequency Division Multiple Access (SC-FDMA) is a transmission technique that utilizes single carrier modulation at a transmitter side and frequency domain equalization at a receiver side. SC-FDMA has similar performance and essentially the same overall complexity as those of OFDMA system. Similar to OFDMA, SC-FDMA transmits information "symbols" across multiple orthogonal frequencies (also as referred to as subcarriers, tones, bins, frequency channels.) However, a SC-FDMA signal transmits the subcarriers sequentially, rather than in parallel as in OFDMA. As such, a SC-FDMA signal has a lower peak-to-average power ratio (PAPR) because of its inherent single carrier structure. Thus, SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), LTE-A, or Evolved UTRA.

SUMMARY

Certain aspects of the present disclosure provide a method for wireless communications. The method generally includes receiving a stream of orthogonal frequency-division multiplexing (OFDM) symbols and processing the stream of OFDM symbols utilizing a data path having a pre-determined throughput rate. The processing may comprise interleaving a first number of OFDM symbols in the stream at a time, and utilizing a second number of discrete Fourier transform (IDFT) engines to process the interleaved OFDM symbols, wherein the first and second numbers are selected based on the pre-determined throughput rate of the data path.

Certain aspects of the present disclosure provide an apparatus for wireless communications. The apparatus generally includes a receiver module configured to receive a stream of orthogonal frequency-division multiplexing (OFDM) symbols and a processor module configured to process the stream of OFDM symbols utilizing a data path having a pre-determined throughput rate. The processor module may be generally configured to interleave a first number of OFDM symbols in the stream at a time. The processor module may also include a second number of inverse discrete Fourier transform (IDFT) engines. The processor module may be configured to utilize the IDFT engines to process the interleaved OFDM symbols, wherein the first and second numbers are selected based on the pre-determined throughput rate of the data path.

Certain aspects of the present disclosure provide an apparatus for wireless communications. The apparatus generally includes means for receiving a stream of orthogonal frequency-division multiplexing (OFDM) symbols and means for processing the stream of OFDM symbols utilizing a data path having a pre-determined throughput rate. The means for processing generally includes means for interleaving a first number of OFDM symbols in the stream at a time, and means for utilizing a second number of inverse discrete Fourier transform (IDFT) engines to process the interleaved OFDM symbols, wherein the first and second numbers are selected based on the pre-determined throughput rate of the data path.

Certain aspects of the present disclosure provide a computer-program product comprising a computer-readable medium having instructions stored thereon. The instructions may be executable by one or more processors for receiving a stream of orthogonal frequency-division multiplexing (OFDM) symbols and processing the stream of OFDM symbols utilizing a data path having a pre-determined throughput rate. The instructions for processing may include instructions for interleaving a first number of OFDM symbols in the stream at a time, and utilizing a second number of inverse discrete Fourier transform (IDFT) engines to process the interleaved OFDM symbols, wherein the first and second numbers are selected based on the pre-determined throughput rate of the data path.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates an example re-ordering of channel estimates according to aspects of the present disclosure.

DETAILED DESCRIPTION

Figure 1:
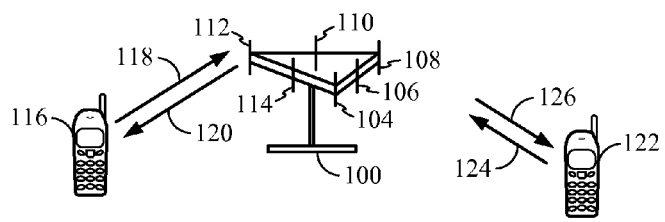
FIG. 1 illustrates a multiple access wireless communication system.

Generally, for uplink communications, a wireless multiple-access communication system may utilize a transmission scheme such as SC-FDMA. According to certain aspects, to process uplink SC-FDMA transmissions, a receiver processor of a base station may perform the following operations in sequence, on an OFDM by OFDM symbol basis: frequency domain data samples (i.e., Y samples), data whitening (i.e., matrix multiplication), minimum mean square error (MMSE) equalization, inverse discrete Fourier transform (IDFT), log-likelihood ratio (LLR) calculation, descrambling, and channel de-interleaving. According to certain aspects, each frequency tone may have at least two spatial layers (i.e., MIMO layers) transmitted on it. Hardware blocks configured to perform the above operations may be designed for a high throughput rate of processing 1 spatial layer per clock cycle, or 1 frequency tone every clock cycle. However, IDFT operations may take as long as 2.5 to 4 clock cycles per frequency tone, and it is noted that hardware implementations of IDFT operations may be difficult to further optimize for faster operation. As such, there are challenges in implementing an uplink receiver processor that ensures a high throughput rate.

Accordingly, certain aspects of the present disclosure provide a receiver processor architecture having various components configured to optimally match operations through a data path to maximize throughput of the receiver processor. According to certain aspects, a receiver processor is configured to perform operations on OFDM symbols in an interleaved order and may instantiate multiple IDFT blocks to work on multiple OFDM symbols in parallel to optimally match throughput of Physical Uplink Shared Data Channel (PUSCH) processing.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE and LTE-A, and LTE terminology is used in much of the description below.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

An access point ("AP") may be a fixed station for communicating with AT(s) and may comprise, be implemented as, or known as NodeB, Radio Network Controller ("RNC"), a E-UTRAN Node B, sometimes referred to as an "evolved Node B" (eNodeB or eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the aspect shown in FIG. 1, each antenna group is designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
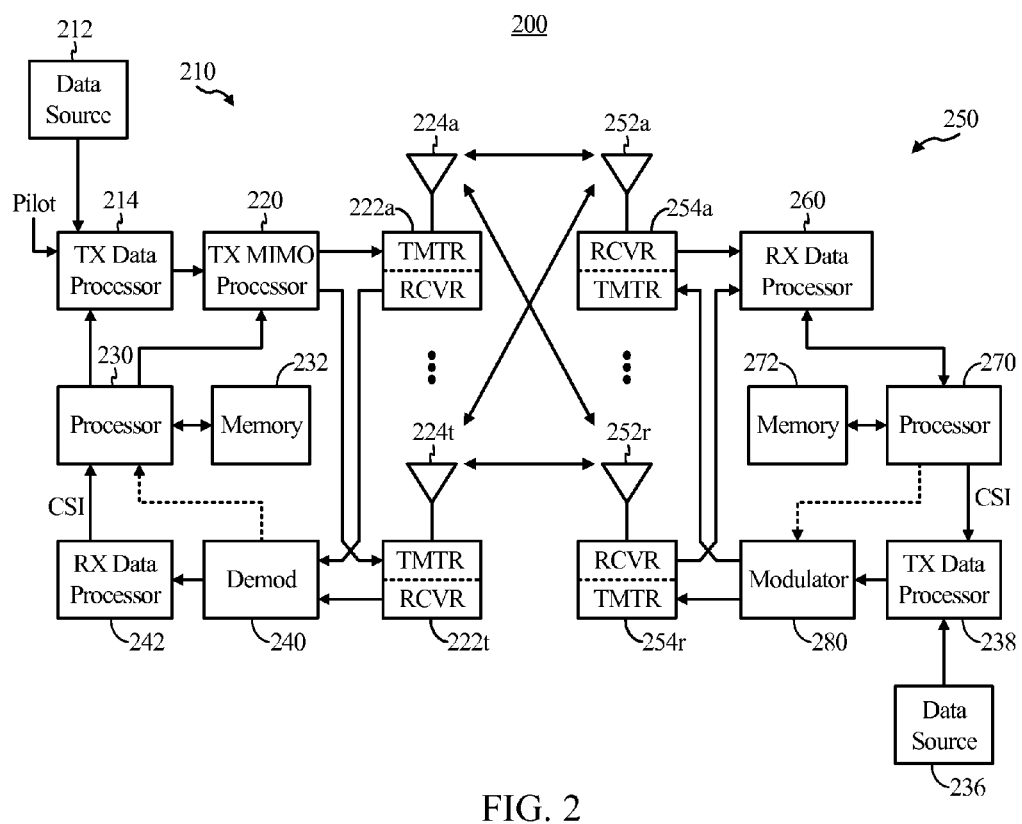
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The reverse link message may comprise various types of information regarding the communication link and/or the received data stream. According to certain aspects, the reverse link message may comprise a PUSCH data channel. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

According to certain aspects, the transmitter system 210 may be configured to optimally match data path throughput while processing the reverse link message as discussed in the present disclosure. According to certain aspects, the transmitter system 210 may be configured to send OFDM symbols through the RX data processor 242 two at a time through the RX data processor 242. According to certain aspects, the RX data processor 242 may comprise at least four IDFT engines configured to process the interleaved OFDM symbols. According to certain aspects, the RX data processor 242 may comprise at least two IDFT engines for each spatial layer of the reverse link message.

Figure 3:
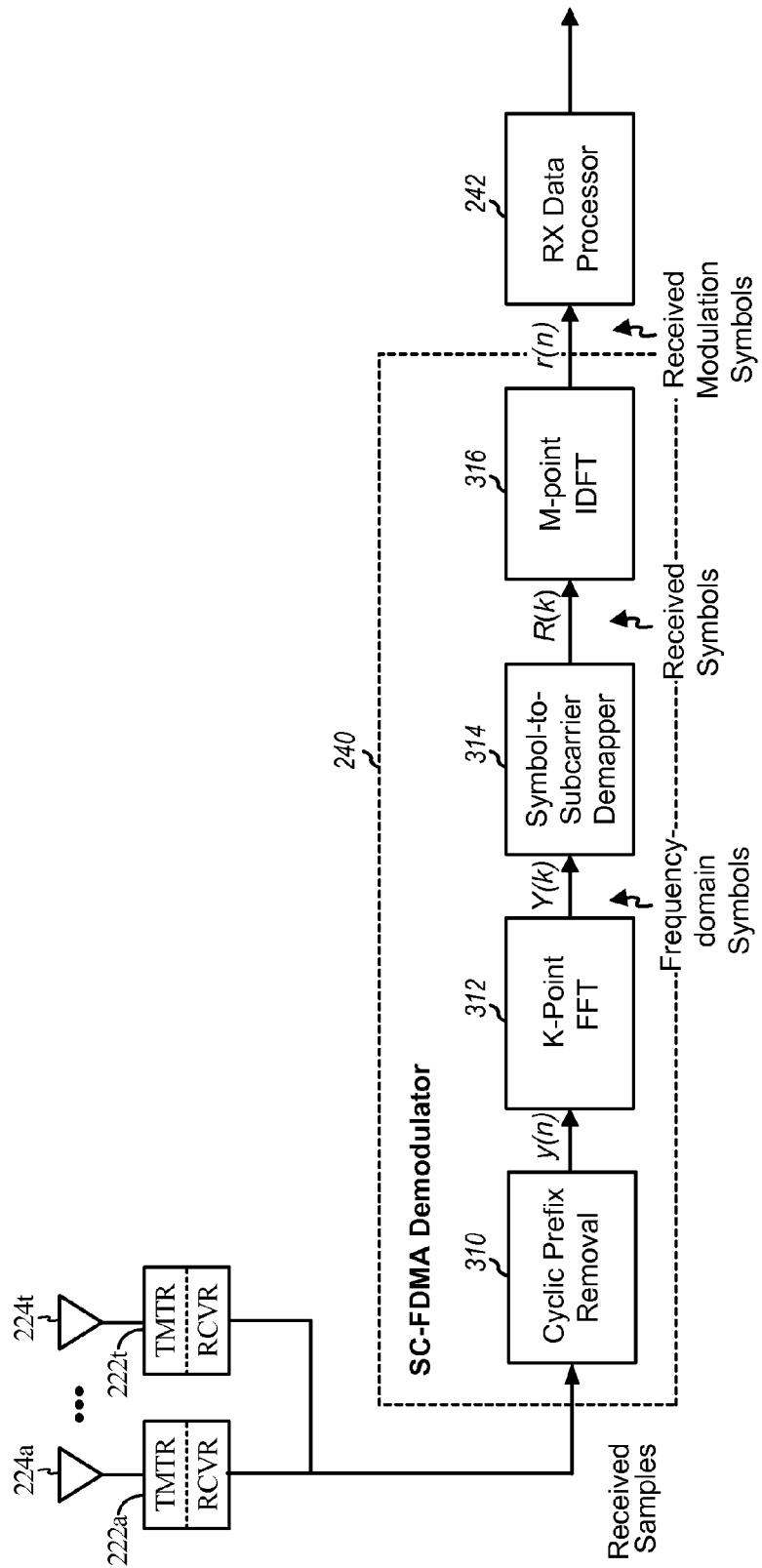
FIG. 3 is a block diagram of a demodulator of the example wireless communication system in FIG. 2.

FIG. 3 shows a block diagram of a demodulator 240 that may be used in accordance with certain aspects of the present disclosure. The demodulator 240 may be configured to perform demodulation on received SC-FDMA waveforms and provide reference and data symbols to the RX data processor 242. As illustrated, the demodulator 240 includes a cyclic prefix removal module 310 that receives a plurality of samples for a received SC-FDMA symbol from the plurality of antennas 224a through 224r. The cyclic prefix removal module 310 is configured to remove received samples corresponding to cyclic prefixes. As illustrated, the cyclic prefix removal module 310 provides K received samples y(n) (i.e., the useful portion of the received SC-FDMA symbol) to a K-point fast Fourier Transform (FFT) unit 312 configured to perform a K-point FFT on the K received samples to transform the K received samples onto the frequency domain and generate K frequency domain symbols Y(k). As illustrated, the K-point FFT unit 312 provides the K frequency domain symbols Y(k) for a K total subcarriers (i.e., frequency tones) to a symbol-to-subcarrier demapper 314. The symbol-to-subcarrier demapper 314 is configured to provide M received symbols R(k) from M subcarriers to an M-point IDFT module 316.

According to certain aspects, the M-point IDFT modules 316 may comprise a plurality of IDFT engines configured to process an interleaved stream of symbols provided by the symbol-to-subcarrier demapper 314. As illustrated, the M-point IDFT module 316 performs an M-point IDFT procedure on the M received symbols r(n) and provides the M received modulation symbols r(n) to the RX data processor 242. According to certain aspects, the RX data processor 242 may process the M received modulation symbols r(n) with a channel estimate and recover the data transmitted in the received SC-FDMA wave-form by performing descrambling and channel de-interleaving.

According to certain aspects, logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

According to certain aspects, Transport Channels are classified into DL and UL. DL Transport Channels comprise a Broadcast Channel (BCH), a Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

According to certain aspects, a channel structure is provided that preserves low PAR (at any given time, the channel is contiguous or uniformly spaced in frequency) properties of a single carrier waveform.

For the purposes of the present document, the following abbreviations apply:
ACK Acknowledgement
AM Acknowledged Mode
AMD Acknowledged Mode Data
ARQ Automatic Repeat Request
BCCH Broadcast Control CHannel
BCH Broadcast CHannel
BW Bandwidth
C- Control-
CB Contention-Based
CCE Control Channel Element
CCCH Common Control CHannel
CCH Control CHannel
CCTrCH Coded Composite Transport Channel
CDM Code Division Multiplexing
CF Contention-Free
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DRS Dedicated Reference Signal
DSCH Downlink Shared Channel
DSP Digital Signal Processor
DTCH Dedicated Traffic CHannel
E-CID Enhanced Cell IDentification EPS Evolved Packet System
FACH Forward link Access CHannel
FDD Frequency Division Duplex
FDM Frequency Division Multiplexing
FSTD Frequency Switched Transmit Diversity
HARQ Hybrid Automatic Repeat/request
HW Hardware
IC Interference Cancellation
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control Channel
MMSE Minimum Mean Squared Error
MRW Move Receiving Window
MSB Most Significant Bit
MSCH MBMS point-to-multipoint Scheduling CHannel
MTCH MBMS point-to-multipoint Traffic CHannel
NACK Non-Acknowledgement
PA Power Amplifier
PBCH Physical Broadcast CHannel
PCCH Paging Control CHannel
PCH Paging CHannel
PCI Physical Cell Identifier
PDCCH Physical Downlink Control CHannel
PDU Protocol Data Unit
PHICH Physical HARQ Indicator CHannel
PHY PHYsical layer
PhyCH Physical CHannels
PMI Precoding Matrix Indicator
PRACH Physical Random Access Channel
PSS Primary Synchronization Signal
PUCCH Physical Uplink Control CHannel
PUSCH Physical Uplink Shared CHannel
QoS Quality of Service
RACH Random Access CHannel
RB Resource Block
RLC Radio Link Control
RRC Radio Resource Control
RE Resource Element
RI Rank Indicator
RNTI Radio Network Temporary Identifier
RS Reference Signal
RTT Round Trip Time
Rx Receive
SAP Service Access Point
SDU Service Data Unit
SFBC Space Frequency Block Code
SHCCH SHared channel Control CHannel
SNR Signal-to-Interference-and-Noise Ratio
SN Sequence Number
SR Scheduling Request
SRS Sounding Reference Signal
SSS Secondary Synchronization Signal
SU-MIMO Single User Multiple Input Multiple Output
SUFI SUper Field
SW Software
TA Timing Advance
TCH Traffic CHannel
TDD Time Division Duplex
TDM Time Division Multiplexing
TFI Transport Format Indicator
TPC Transmit Power Control
TTI Transmission Time Interval
Tx Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
VOIP Voice Over Internet Protocol
MBSFN multicast broadcast single frequency network
MCH multicast channel
DL-SCH downlink shared channel
PDCCH physical downlink control channel
PDSCH physical downlink shared channel

EXAMPLE IMPLEMENTATION OF PUSCH RECEIVER MATCHED TO INCREASE THROUGHPUT

Typically, a PUSCH receiver of a base station (such as an LTE eNodeB) may send OFDM data symbols through the receiver one OFDM symbol at a time to process an SC-FDMA waveform. According to certain aspects of the present disclosure, a hardware implementation of a receiver processor is provided wherein OFDM symbols may be sent two at a time interleaved through the PUSCH receiver. For example, for an uplink transmission transmitted across a plurality of frequency tones during a plurality of symbol periods, OFDM symbols may be processed in the following order: OFDM symbol 0 tone 0, OFDM symbol 1 tone 0, OFDM symbol 0, tone 1, OFDM symbol 1 tone 1, etc.

Additionally, according to certain aspects, a receiver processor architecture is described herein having a plurality of IDFT engines selected to match the throughput of the data path in the processor. Typically, a receiver processor may utilize one IDFT engine per OFDM symbol per spatial layer. Thus, receivers that process uplink transmissions having two spatial layers may utilize two IDFT engines (i.e., one OFDM symbol at a time by two layers.) However, the throughput of the receiver may be only as fast as the "weakest link" which generally was the IDFT engine which took 2.5 to 4 cycles per tone to complete processing.

Accordingly, certain aspects of the present disclosure provide an architecture wherein twice as many IDFT engines may be instantiated. For example, by instantiating four IDFT engines (to process two OFDM symbols at a time by two spatial layers), the throughput may be increased substantially. In this case, the throughput of the IDFT operations may be increased from 2.5 to 4 cycles per tone to 1.25 to 2 cycles per tone. According to certain aspects, an increased number of the IDFT engines may allow the whole PUSCH receiver can process 1 tone every 2 clock cycles. As such, by interleaving OFDM symbols two at a time through a PUSCH receiver and by having four IDFT blocks rather than two, IDFT operation throughput may be matched to the whole PUSCH receiver to improve overall throughput of the receiver.

Figure 4:
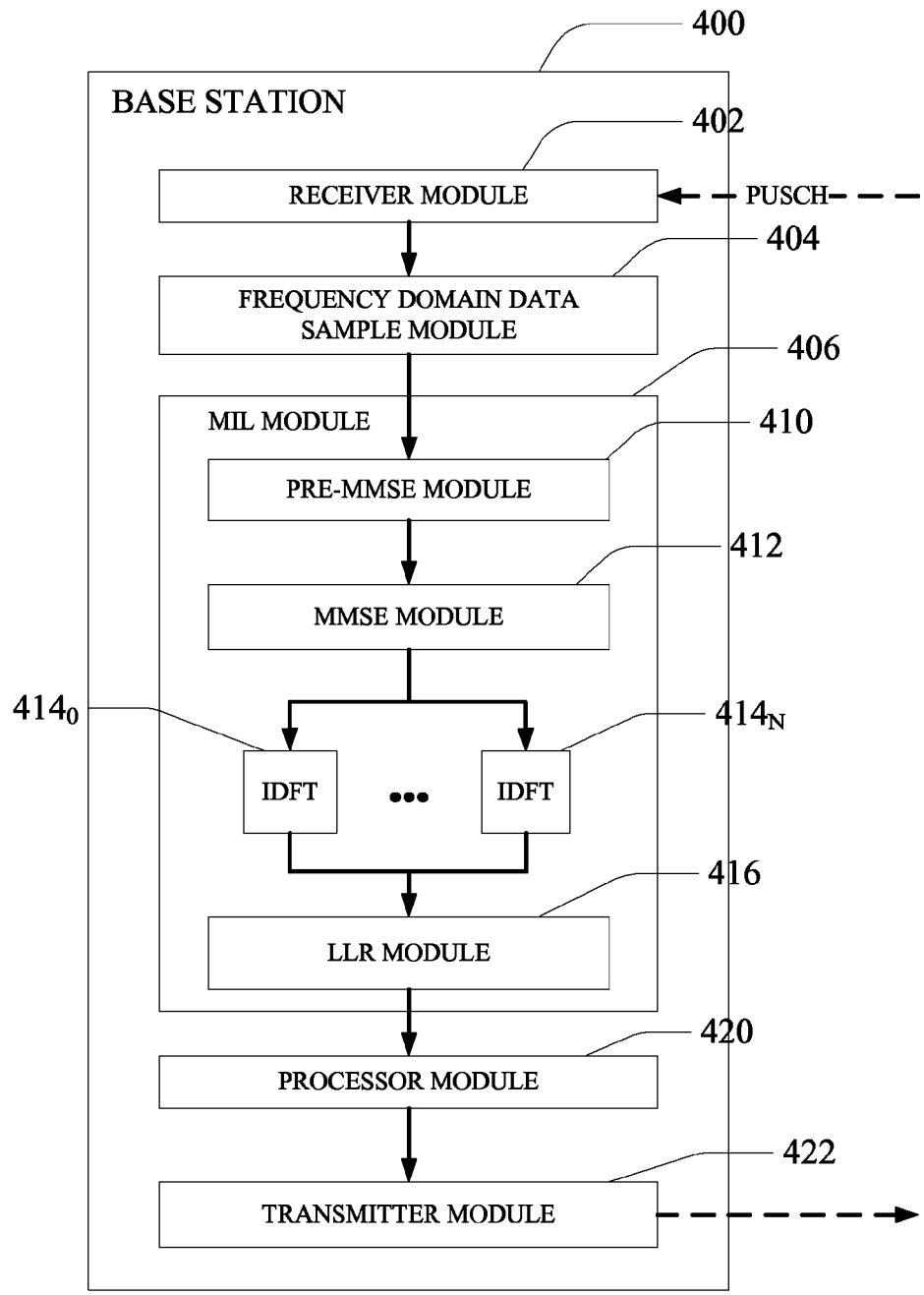
FIG. 4 is a block diagram illustrating example modules of a wireless communication system capable of implementing techniques presented herein.

FIG. 4 depicts a block diagram of a base station 400 according to certain aspects of the present disclosure. As illustrated, the base station 400 includes a receiver module 402 configured to receive an uplink transmission signal comprising PUSCH data channel from a UE (not shown). As illustrated, the receiver module 402 provides the received uplink signal to a frequency domain data sample module 404 configured to transform the received uplink signal into the frequency domain and provide frequency domain data samples (also referred to as "Y" or "IQ" samples). An IQ ("in-phase/quadrature") sample is generally known as a complex representation of a constellation point of a given subcarrier received on a given antenna, and may be the output of a FFT. As illustrated, the frequency domain data sample module 404 provides the samples and received uplink signal to a MIL ("MMSE-IDFT-LLR") module 406.

As illustrated, the MIL module includes a "pre-MMSE" module 410 configured to receive the samples and perform data whitening (i.e., matrix multiplication) and provide the samples and whitening matrices to a MMSE module 412. According to certain aspects, the "pre-MMSE" module 410 may also be configured to perform various preparatory functions such as channel interpolation, phase de-rotation, channel whitening, and data whitening.

As illustrated, the MMSE module 412 receives the samples and whitening matrices and performs symbol-to-subcarrier demapping and frequency domain equalization on the received samples to generate an equalized symbol stream. As illustrated, the MMSE module 412 provides the equalized symbol stream to a plurality of IDFT blocks $414_0$ through $414_N$ configured to perform IDFT operations on the equalized symbol stream to transform the symbol stream to the time domain and provide received modulation symbols. According to certain aspects, the MMSE module 412 may provide the equalized symbol stream to the plurality of IDFT blocks $414_0$ through $414_N$ in an interleaved order two symbols at a time. For sake of discussion, the IDFT blocks $414_0$ through $414_N$ are depicted in FIG. 4 as part of the MIL module 406, but it is contemplated that the IDFT blocks may sit external to the MIL module 406.

As illustrated, the IDFT blocks $414_0$ through $414_N$ provide the received modulation symbols to a LLR module 416 configured to calculate LLR values. As illustrated, the LLR module 416 provides the LLR values and received modulation symbols to a processor module 420 to further process the data stream to retrieve a data portion of the uplink signal. According to certain aspects, the processor module 420 is configured to process the received modulation symbols and LLR values to recover data traffic portion by descrambling, de-interleaving, and decoding the data stream.

According to certain aspects, the interconnected modules of the base station 400 may include a data path having a pre-determined throughput rate for processing received transmissions. While certain aspects of present disclosure are described herein in relation to a data path having a throughput rate of 2 clock cycles per tone, other similar processor architectures having other pre-determined throughput rates are contemplated.

As described above, the MIL module 406 may be configured to perform various functions such as channel interpolation, phase de-rotation, channel whitening, and data whitening, utilizing the pre-MMSE module 410). According to certain aspects, the MIL module 406 may be operated to process PUSCH transmissions (i.e., "PUSCH mode') and/or SRS transmissions ("SRS mode"). According to certain aspects, the MIL module 406 may perform frequency domain equalization (MMSE). Additionally, within the MIL module 406, LLRs may be computed and utilized for descrambling and de-interleaving.

According to certain aspects, the MIL module 406 may be configured to compute the SNRs for PUSCH and SRS modes given channel estimates, whitening matrix values, and antenna samples for 1, 2, or 4 antennas. According to certain aspects, the MIL module may support one or two users for PUSCH mode and up to four users per interface in SRS mode. In PUSCH mode, the MIL module may compute LLRs per tone, per symbol, per active users and may compute equalized SNR results per active user, per slot. In SRS mode, the MIL module may compute estimated SNR results per user, per resource block, per interlace. According to certain aspects, the MIL module 406 may produce symbol LLRs per cycle at the output of the MIL module.

According to certain aspects, in a time period allocated to a Reference Signal Processor (RSP), channel estimates may first be computed and stored in memory, within a Channel Estimator (CE) block. After channel estimates (i.e., $N_{RX}$-by-$N_{TX}$ or $N_{RX}$-by-$N_{slot}$ matrix) are computed in the frequency domain and stored, noise signal calculation may be performed by an Interference Estimator (IE). The output of the noise signal calculation is an $N_{RX}$-by-$N_{RX}$ whitening matrix. After the time period allocated to the RSP has expired and pilot symbol processing has been completed, the MIL module 406 may proceed to process PUSCH.

According to certain aspects, a hardware block referred herein as the MIL module performs calculation of LLRs and User SNR results from the channel estimates ("H"), whitening matrices ("W"), and IQ samples ("Y"). The MIL module may include various modules configured to perform the processes described herein. Additionally, the MIL module may be configured to send data to and receive data from external components to perform the processes described. For example, the MIL module may be operatively coupled to a task manager (TM) via a task interface to receive assigned tasks and commands for processing a subframe. In another example, the MIL module may be operatively coupled to a Sample Reader (SR) configured to store sample data received from the receiver module.

According to certain aspects, the MIL module may request channel estimate data from the CE block, sample data from the Sample Reader (SR), and whitening matrices from the IE blocks, and may receive the requested data via a plurality of input streams, denoted as "H" (channel estimates), "Y" (IQ samples), "$W_h$" and "$W_y$" (corresponding whitening matrices).

According to certain aspects, for PUSCH mode, the MIL module may compute LLRs via a main LLR processing path and send the LLR values to a Soft Signal Processor (SSP), such as processor module 420, on the fly, using the data delivered from the four input streams (i.e., H, Y, $W_H$ and $W_Y$). According to certain aspects, the MIL module may compute equalized SNRs along a data path branched off the main LLR processing data path. According to certain aspects, for SRS mode, the MIL module may compute and deliver estimated SNRs using the data delivered from the two input streams (H and $W_H$).

According to certain aspects, the pre-MMSE module 410 may be configured to process the IQ samples and the channel estimates, received by the MIL module, in a Y-pipeline and H-pipeline, respectively. According to certain aspects, the H-pipeline handles reordering, interpolation, phase de-rotation and whitening of the channel estimates. Similarly, the Y-pipeline handles the reordering and whitening of the IQ samples.

The pre-MMSE module 410 may also include a Parameter block configured to handle incoming task data and extract out relevant parameters to send to the H- and Y-pipelines for processing. The Parameter block may also send data requests to the Sample Reader, Interference Estimator, and Channel Estimator blocks and receive IQ samples, channel estimates, and whitening matrices on the Parameter block's input ports.

As described above, the H-pipeline may be configured to perform processing on the channel estimates (H). According to certain aspects, for low Doppler and non-hopped assignments, the channel estimates provided by the CE block may be per subframe. For high Doppler or hopped assignments, the channel estimates may be per slot.

According to certain aspects, the H-pipeline may include a reordering block configured to re-order the channel estimates as suitable for processing by later blocks (e.g., a channel whitening block). As illustrated in FIG. 5, the channel estimates delivered to the MIL module may comprise four channel estimates values per H stream cycle. All H values may be delivered regardless of a given antenna mode (e.g., 1, 2, or 4). The H values for the inactive fields may be zeroed out. According to certain aspects, the reordering block first delivers the H values per slot/transmitter antenna for receiver antenna 0 and 1, followed by the H values for receiver antennas 2 and 3, as illustrated in FIG. 5. The reordering block of the channel estimates groups the H values on a slot/layer basis as specified for the channel whitening block. The outgoing stream has 4 H values per cycle, with the even and odd slot/layer alternating every cycle.

According to certain aspects, the H-pipeline further includes a frontend block configured to receive W whitening matrix values per resource block per slot, in an alternating fashion, from the Interference Estimator. The frontend block may de-serialize the W matrix values of both slots and select one matrix value corresponding to the slot being processed. According to certain aspects, the Interference Estimator may then read the W values from memory repeatedly for as many times as indicated by the MIL module. Each W matrix may be repeated 24 times, as specified for the channel whitening block. It is noted that a frontend block may also be instantiated in the Y pipeline.

According to certain aspects, the reordering block of the H-pipeline provides the reordered channel estimates to a channel-interpolation-phase-de-rotation (CIPD) block. The CIPD block instantiates channel interpolation and phase compute blocks in parallel. According to certain aspects, the reordered channel estimates are interpolated based on the interpolation weights while phase values are computed. Then, the CIPD block performs de-rotation on the interpolated channel estimates and provides the result to a channel whitening block.

According to certain aspects, the channel whitening block of the H-pipeline receives the channel estimates and whitening matrices and computes whitened channel estimates. The received channel estimates may be per slot/layer, even followed by odd. According to certain aspects, the two streams (e.g., channel estimates and whitening matrices) may be lined up with a combiner prior to whitening. The channel whitening block may provide the whitened channel estimates to a whitened-channel demultiplexer configured to de-serialize the whitened channel estimate vectors into a 4×2 matrix.

Figure 6:
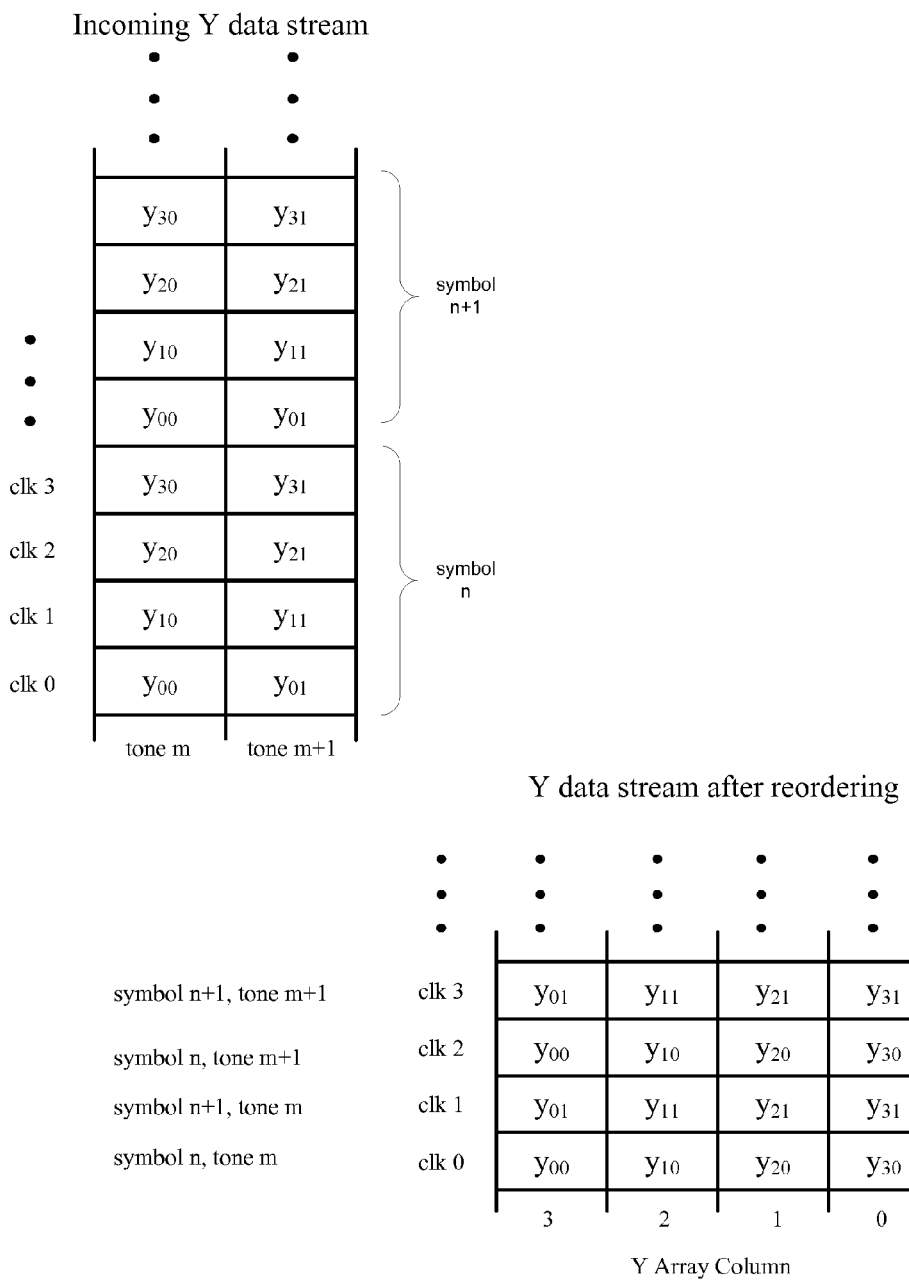
FIG. 6 illustrates an example re-ordering of data samples according to aspects of the present disclosure.

Returning to the Y-pipeline, the Y-pipeline may include a reordering block configured to receive the IQ samples and re-group the IQ samples to optimally match throughput through the receiver processor, according to certain aspects of the present disclosure. As discussed earlier, the IQ samples delivered to the MIL module may comprise 2-antenna samples per cycle—(i.e., a pair of tones per receiver antenna per symbol.) Tones for all 4 antennas are received regardless of a given antenna mode (i.e., 1, 2, or 4). According to certain aspects, the IQ samples may alternate between pairs of symbols (except for last symbol in SRS mode) as illustrated in FIG. 6. Throughout the MIL module, the data streams may be symbol interleaved. As such, the reordering block arranges the IQ samples per tone per symbol to create a sample stream comprising four samples per cycle on an outbound side. In other words, the reordering block may group four IQ samples at a time to be processed for every processing cycle. The reordering block may provide the reordered IQ samples to a data whitening block. According to certain aspects, a repeater block may be used to duplicate the data to enable the whitening block to reuse certain math blocks using TDM.

According to certain aspects, the data whitening block of the Y-pipeline receives the reordered IQ samples (from the reordering block) and a whitening matrix $W_Y$ (from the Y-pipeline frontend block) to perform whitening on the data symbols. According to certain aspects, the reordered IQ samples and the whitening matrix may be combined prior to whitening. According to certain aspects, after whitening has been completed, the data whitening blocks of the Y-pipeline and of the H-pipeline provide the whitened IQ samples ($Y_W$) and whitened channel estimates ($H_W$) to an MMSE module, such as MMSE module 412, configured to perform frequency domain equalization.

According to certain aspects, the MMSE module may receive and process the whitened IQ samples ($Y_W$) and whitened channel estimates ($H_W$) utilizing a frequency domain equalization procedure, such as MMSE equalization. According to certain aspects, the MMSE module may process the samples and channel estimates to provide an equalized symbol stream and estimated SNR values for the symbols to an IDFT block.

According to certain aspects, the IDFT block may include a plurality of IDFT engines, such as IDFT engines $414_0$ through $414_N$, configured to perform IDFT operations to transform input symbols into the time domain. According to certain aspects, the amount of IDFT engines may be selected such that the throughput of the entire data path may be optimally matched. According to certain aspects, the amount of IDFT engines may be determined by calculating the number of IDFT engines that may work in parallel so as to complete processing of at a throughput rate matching other components in a data pipeline of the receiver processor. According to certain aspects, the number of IDFT engines may be selected so as to process 1 tone every 2 processing cycles. As such, in certain aspects where the receiver processor may process 2 symbols having 2 layers, the IDFT block may comprise at least 4 IDFT engines. The IDFT block may perform IDFT operations and provide modulation symbols to a LLR module.

According to certain aspects, the LLR module may be configured to receive the combined symbol stream and SNR values from the IDFT block and calculate LLR values for each of the symbols in the symbol stream. According to certain aspects, the LLR module provides the LLR values and symbols to a descrambler block and to a de-interleaver block to assist with descrambling and de-interleaving, respectively.

Figure 7:
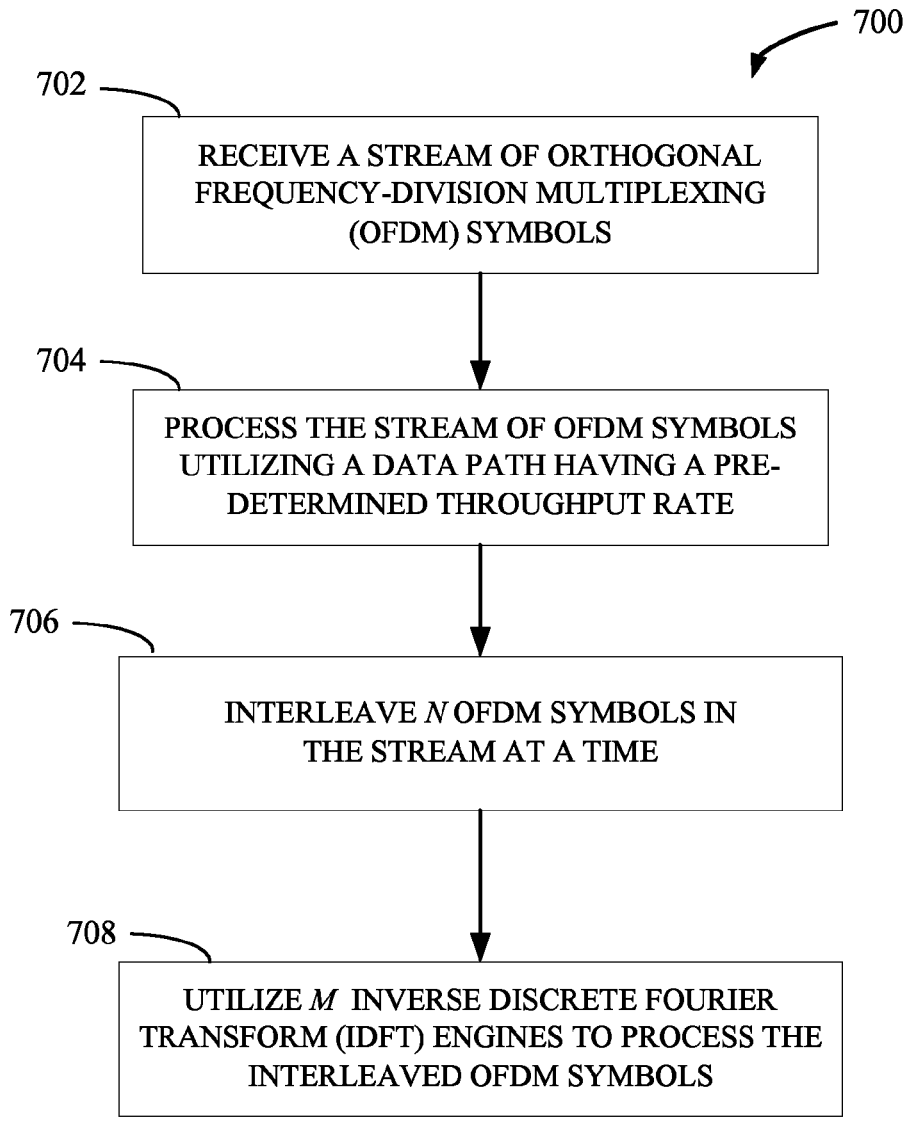
FIG. 7 illustrates an example operation that may be performed by a communications apparatus according to certain aspects of the present disclosure.

FIG. 7 illustrates example operations 700 for operating a base station according to certain aspects of the present disclosure. According to certain aspects, the example operations 700 may be performed by a base station such as the base station 400. It is contemplated that other suitable components and apparatuses configured according to certain aspects of the present disclosure may be utilized to perform the example operation 700.

Example operation 700 provides a method for operating a base station to efficiently process uplink transmission according to certain aspects of the present disclosure. The operation 700 begins, at 702, by receiving a stream of orthogonal frequency-division multiplexing (OFDM) symbols. The stream of OFDM symbols may comprise a PUSCH transmission. According to certain aspects, the base station may receive the stream of OFDM symbols on a plurality of frequency tones having at least two layers, wherein each layer of each tone corresponds to one of the OFDM symbols. The operation continues, at 704, where the base station processes the stream of OFDM symbols utilizing a data path having a pre-determined throughput rate. According to certain aspects, the processing may include a procedure illustrated at 706 and 708. As shown, at 706, the base station interleaves N OFDM symbols in the stream at a time. According to certain aspects, the base station interleaves at least two of the OFDM symbols at a time. According to certain aspects, the OFDM symbols may be interleaved based on frequency tones.

At 708, the base station may utilize M IDFT engines to process the interleaved OFDM symbols. According to certain aspects, N and M may be selected based on the pre-determined throughput rate of the data path. According to certain aspects, N and M may be selected in an effort to match an overall throughput rate of the IDFT engines, which results from processing a stream of symbols interleaved N OFDM symbols at a time utilizing M IDFT engines, with the pre-determined throughput rate of the data path. According to certain aspects, the base station may utilize at least four IDFT engines. According to certain aspects, the base station processes the interleaved OFDM symbols using at least two IDFT engines for each layer. According to certain aspects, where the data path may have a throughput rate of 2 cycles per tone, the base station may process the interleaved OFDM symbols using the IDFT engines at a rate in a range of approximately 1.25 to 2 cycles per tone.

Accordingly, certain aspects of the present disclosure provide a receiver processor architecture having an optimally matched throughput. The receiver processor architecture described herein advantageously provides a 2× improvement in throughput at a cost of 2 additional IDFT engines. Additionally, the receiver processor throughput is matched throughout a data path through the receiver, which advantageously provides an efficient implementation having substantially reduced bottlenecks in processing.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for receiving may comprise a receiver, such as the receiver unit 254 of the receiver system 250 depicted in FIG. 2 or the receiver unit 222 of the transmitter system 210 shown in FIG. 2. Means for interleaving, means for processing, and/or means for using may comprise a processing system, which may include one or more processors, such as the demodulator 240 or RX data processor 242 of the transmitter system 210 illustrated in FIG. 2. These means may also comprise any suitable combination of the receiver module 402, the frequency domain data sample module 404, the MIL module 406, the processor module 420, and the transmitter module 422 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   receiving a stream of orthogonal frequency-division multiplexing symbols;
   processing the stream of orthogonal frequency-division multiplexing symbols utilizing a data path comprising one or more inverse discrete Fourier transform blocks, each block having a pre-determined throughput rate, the processing comprises:
      interleaving a first number of orthogonal frequency-division multiplexing symbols in the stream at a time for each block; and
      utilizing, for each block, a second number of inverse discrete Fourier transform engines operating in parallel within each block to process the interleaved orthogonal frequency-division multiplexing symbols, wherein the first and second numbers are selected based on the pre-determined throughput rate of the data path for each block.

2. The method of claim 1, wherein the first and second numbers are selected in an effort to match an overall throughput rate of the inverse discrete Fourier transform engines with the pre-determined throughput rate of the data path.

3. The method of claim 1, wherein the interleaving comprises interleaving at least two of the orthogonal frequency-division multiplexing symbols at a time; and
   wherein the utilizing comprises utilizing at least four inverse discrete Fourier transform engines to process the interleaved orthogonal frequency-division multiplexing symbols.

4. The method of claim 1, wherein the receiving further comprises receiving the stream of orthogonal frequency-division multiplexing symbols on a plurality of frequency tones having at least two layers, wherein each layer of each tone corresponds to one of the orthogonal frequency-division multiplexing symbols.

5. The method of claim 4, wherein the processing further comprises processing the interleaved orthogonal frequency-division multiplexing symbols using at least two inverse discrete Fourier transform engines for each layer.

6. The method of claim 1, wherein the interleaving comprises interleaving at least two of the orthogonal frequency-division multiplexing symbols based on frequency tones.

7. The method of claim 1, wherein the stream of orthogonal frequency-division multiplexing symbols comprise a physical uplink shared channel.

8. An apparatus for wireless communications, comprising:
   a receiver module configured to receive a stream of orthogonal frequency-division multiplexing symbols;
   a processor module configured to process the stream of orthogonal frequency-division multiplexing symbols utilizing a data path comprising one or more inverse discrete Fourier transform blocks, each block having a pre-determined throughput rate,
   wherein the processor module is configured to interleave a first number of orthogonal frequency-division multiplexing symbols in the stream at a time for each block,
   wherein the processor module comprises, for each block, a second number of inverse discrete Fourier transform engines operating in parallel within each block, and
   wherein the processor module is configured to utilize the inverse discrete Fourier transform engines to process the interleaved orthogonal frequency-division multiplexing symbols, wherein the first and second numbers are selected based on the pre-determined throughput rate of the data path for each block.

9. The apparatus of claim 8, wherein the first and second numbers are selected in an effort to match an overall throughput rate of the inverse discrete Fourier transform engines with the pre-determined throughput rate of the data path.

10. The apparatus of claim 8, wherein the processor module is further configured to interleave at least two of the orthogonal frequency-division multiplexing symbols at a time; and
    wherein the processor module is further configured to utilize at least four inverse discrete Fourier transform engines to process the interleaved orthogonal frequency-division multiplexing symbols.

11. The apparatus of claim 8, wherein the receiver module is further configured to receive the stream of orthogonal frequency-division multiplexing symbols on a plurality of frequency tones having at least two layers, wherein each layer of each tone corresponds to one of the orthogonal frequency-division multiplexing symbols.

12. The apparatus of claim 11, wherein the processor module is further configured to process the interleaved orthogonal frequency-division multiplexing symbols using at least two inverse discrete Fourier transform engines for each layer.

13. The apparatus of claim 8, wherein the processor module is further configured to interleave at least two of the orthogonal frequency-division multiplexing symbols based on frequency tones.

14. The apparatus of claim 8, wherein the stream of orthogonal frequency-division multiplexing symbols comprise a physical uplink shared channel.

15. An apparatus for wireless communications, comprising:
    means for receiving a stream of orthogonal frequency-division multiplexing symbols;
    means for processing the stream of orthogonal frequency-division multiplexing symbols utilizing a data path comprising one or more inverse discrete Fourier transform blocks, each block having a pre-determined throughput rate, the means for processing comprises:
       means for interleaving a first number of orthogonal frequency-division multiplexing symbols in the stream at a time for each block; and
       means for utilizing, for each block, a second number of inverse discrete Fourier transform engines operating in parallel within each block to process the interleaved orthogonal frequency-division multiplexing symbols, wherein the first and second numbers are selected based on the pre-determined throughput rate of the data path for each block.

16. The apparatus of claim 15, wherein the first and second numbers are selected in an effort to match an overall throughput rate of the inverse discrete Fourier transform engines with the pre-determined throughput rate of the data path.

17. The apparatus of claim 15, wherein the means for interleaving comprises means for interleaving at least two of the orthogonal frequency-division multiplexing symbols at a time; and wherein the means for utilizing comprises means for utilizing at least four inverse discrete Fourier transform engines to process the interleaved orthogonal frequency-division multiplexing symbols.

18. The apparatus of claim 15, wherein the means for receiving further comprises means for receiving the stream of orthogonal frequency-division multiplexing symbols on a plurality of frequency tones having at least two layers, wherein each layer of each tone corresponds to one of the orthogonal frequency-division multiplexing symbols.

19. The apparatus of claim 18, wherein the means for processing further comprises means for processing the interleaved orthogonal frequency-division multiplexing symbols using at least two inverse discrete Fourier transform engines for each layer.

20. The apparatus of claim 15, wherein the means for interleaving comprises means for interleaving at least two of the orthogonal frequency-division multiplexing symbols based on frequency tones.

21. The apparatus of claim 15, wherein the stream of orthogonal frequency-division multiplexing symbols comprise a physical uplink shared channel.

22. A computer-program product comprising a non-transitory computer-readable medium having instructions stored thereon, the instructions executable by one or more processors for:
receiving a stream of orthogonal frequency-division multiplexing symbols;
processing the stream of orthogonal frequency-division multiplexing symbols utilizing a data path comprising one or more inverse discrete Fourier transform blocks, each block having a pre-determined throughput rate, the instructions for processing comprising instructions for:
interleaving a first number of orthogonal frequency-division multiplexing symbols in the stream at a time for each block; and
utilizing, for each block, a second number of inverse discrete Fourier transform engines operating in parallel to process the interleaved orthogonal frequency-division multiplexing symbols, wherein the first and second numbers are selected based on the pre-determined throughput rate of the data path for each block.

23. The computer-program product of claim 22, wherein the first and second numbers are selected in an effort to match an overall throughput rate of the inverse discrete Fourier transform engines with the pre-determined throughput rate of the data path.

24. The computer-program product of claim 22, wherein the instructions for interleaving comprise instructions for interleaving at least two of the orthogonal frequency-division multiplexing symbols at a time; and
wherein the instructions for utilizing comprise instructions for utilizing at least four inverse discrete Fourier transform engines to process the interleaved orthogonal frequency-division multiplexing symbols.

25. The computer-program product of claim 22, wherein the instructions for receiving further comprise instructions for receiving the stream of orthogonal frequency-division multiplexing symbols on a plurality of frequency tones having at least two layers, wherein each layer of each tone corresponds to one of the orthogonal frequency-division multiplexing symbols.

26. The computer-program product of claim 25, wherein the instructions for processing further comprise instructions for processing the interleaved orthogonal frequency-division multiplexing symbols using at least two inverse discrete Fourier transform engines for each layer.

27. The computer-program product of claim 22, wherein the instructions for interleaving comprise instructions for interleaving at least two of the orthogonal frequency-division multiplexing symbols based on frequency tones.

28. The computer-program product of claim 22, wherein the stream of symbols comprise physical uplink shared channel.

* * * * *